United States Patent
Zhu et al.

(10) Patent No.: US 6,285,661 B1
(45) Date of Patent: Sep. 4, 2001

(54) LOW DELAY REAL TIME DIGITAL VIDEO MIXING FOR MULTIPOINT VIDEO CONFERENCING

(75) Inventors: Qin-Fan Zhu, Wilmington; Louis J. Kerofsky, Acton, both of MA (US)

(73) Assignee: PictureTel Corporation, Andover, MA (US)

( * ) Notice: Subject to any disclaimer, the term of this patent is extended or adjusted under 35 U.S.C. 154(b) by 0 days.

(21) Appl. No.: 09/014,942

(22) Filed: Jan. 28, 1998

(51) Int. Cl.[7] .................................................. H04L 12/16
(52) U.S. Cl. ............................................. 370/260; 348/14
(58) Field of Search ...................... 370/260–263, 370/391, 505, 465, 468, 473, 474; 348/14, 15; 379/202

(56) References Cited

U.S. PATENT DOCUMENTS

| | | | |
|---|---|---|---|
| 5,453,780 | * | 9/1995 | Chen et al. ............................. 348/15 |
| 5,600,646 | * | 2/1997 | Polomski ............................. 370/263 |
| 5,936,662 | * | 8/1999 | Kim et al. ............................. 348/15 |

* cited by examiner

*Primary Examiner*—Chau Nguyen
*Assistant Examiner*—Alexander D. Boakye
(74) *Attorney, Agent, or Firm*—Ropes & Gray (57) ABSTRACT

A multipoint control unit (MCU) includes a plurality of segment processors arranged to extract segment data from a corresponding plurality of input video streams and a plurality of data queues, each one of the data queues being coupled to a corresponding one of the plurality of segment processors for storing segment data provided from the segment processors. The (MCU) also includes a data combiner coupled to the data queues for combining output data from the data queues and a controller coupled to the combiner for selectively providing data to the combiner in accordance with the amount of the data in the data queues. Several different approaches for determining what queues to obtain data from are described to reduce insertion delay Asymmetric picture rates are also used to reduce the video mixing delay. In addition, the multipoint control unit can optionally have the segment processors including a rate reducer and have the combiner controller send bit rate control information to the reducer to control the operation of the reducer.

38 Claims, 10 Drawing Sheets

| GOB1 | GOB2 |
|---|---|
| GOB3 | GOB4 |
| GOB5 | GOB6 |
| GOB7 | GOB8 |
| GOB9 | GOB10 |
| GOB11 | GOB12 |

FIG. 3A

| GOB1 |
|---|
| GOB3 |
| GOB5 |

LOW DELAY REAL TIME DIGITAL VIDEO MIXING FOR MULTIPOINT VIDEO CONFERENCING

BACKGROUND

This invention relates generally to real-time multipoint video conferencing.

Video teleconferencing systems allow for the simultaneous exchange of audio, video and data information among a plurality of audio-video terminals. In multipoint video conferencing, typically three or more participants are involved in a video conference. The audio, video and data signals associated with each participant are typically compressed by a user audio-video terminal (AVT) and sent to a multipoint control unit (MCU) for further processing. The multipoint control unit performs switching functions to allow all of the three or more audio-video participants to communicate in a video conference. A principal function of an MCU is to process the received signals and transmit the processed, received signals back to the user terminals. The MCU links multiple video conferencing sites together by receiving data units of digital signals from the audio-video terminals, processes the received data units and retransmits the processed data units to appropriate audio-video terminals as data units or frames of digital signals.

The digital signals include audio information, video information, data and control information. The audio signals from two or more audio-video terminals are mixed to form a composite audio signal. The audio processing typically is relatively straightforward. The audio signals are decoded and summed to provide a composite signal. The composite signal is re-encoded as one audio signal. The re-encoded, summed audio signal is transmitted to those terminals whose audio is not contained in the summed signal. Thus, the participants at each of the terminals can hear what the other participants are saying. Audio encoding can be selective, for example, audio encoding can encode the two or three loudest audio signals in the videoconference. Other arrangements are possible.

Video processing, however, is more difficult since there is no simple way to sum several video signals. There are two ways for a multipoint control unit to handle a video signal. In the so-called "switched video mode" one video source is selected as the broadcaster and is sent to all of the terminals. Typically, the broadcaster is the current speaker who receives video from a previous speaker. In this mode, essentially no video processing is needed except for switching the video source. In a second mode, the so-called "continuous presence" mode, multiple, compressed video bit streams are received by the MCU. These bit streams are processed and combined into one video bit stream so that participants can view multiple persons simultaneously. The combination of several digital bit streams into one stream is also known as "digital video mixing." While non-realtime video mixing is relatively easy, real-time video mixing presents significant challenges because it requires highly complex processing. For example, the delay incurred in processing the video bit streams has to be as small as possible so as to facilitate desirable interaction among the conference participants.

SUMMARY

In one aspect of the invention, a method of operating a multipoint control unit for use in a video conference includes extracting segment data from a plurality of video streams, storing the segment data in a corresponding one of a plurality of data queues and determining whether there is data in any of the plurality of data queues that can be included in a new picture. The method combines data from said plurality of data queues in accordance with the determination of whether there is data in the data queues. The output picture rate after combining is related to a maximum input picture rate of said video streams.

In a further aspect of the invention, a method of operating a multipoint control for use in videoconferencing of a plurality of audio-video terminals includes feeding a plurality of video streams to the multipoint control unit, and for each one of said streams, extracting segments data. The segments of data are output to a data queue, and a new picture is formed from the segments of data stored in each of the data queues by including in the new picture data from those queues that have a complete picture. If no queue has a complete picture, the method determines for each of the queues whether the queues have a complete segment of data and, for those queues having a complete segment of data, the method includes data from those queues in the new picture.

In a still further aspect of the invention, a method of operating a multipoint control unit for use in videoconferencing of a plurality of audio-video terminals includes feeding a plurality of video streams to the multipoint control unit. For each one of said streams, extracting segments of data, and adaptively reducing the output bit rates. The segments of data are output to a data queue and a new picture is formed from the segments of data stored in each of the data queues by including in the new picture data from those queues that have a complete picture. If no queue has a complete picture, the method determines for each of the queues whether the queues have a complete segment of data and, for those queues having a complete segment of data, the method includes data from those queues in the new picture.

In a still further aspect of the invention, a computer program product residing on a computer readable medium includes instructions for causing a multipoint control unit to extract segment data to provide a plurality of extracted segment streams, store each one of the segment data streams in a corresponding one of a plurality of data queues, determine which of said data queues has data for inclusion in a new picture, and combine data from said plurality of data queues in accordance with the determination of which data queues have data for inclusion in a new picture.

In a still further aspect of the invention, a multipoint control unit includes a plurality of segment processors arranged to extract segment data from a corresponding plurality of input video streams. The multipoint control unit further includes a plurality of data queues, each one of said data queues being coupled to a corresponding one of said plurality of segment processors for storing segment data provided from said segment processors, a segment combiner coupled to said data queues for combining output data from said data queues, and an optional controller coupled to said combiner for selectively providing rate control data to the segment processors.

One or more of the following advantages are provided by the above. The output picture rate after combining is related to a maximum input picture rate of the video streams. The queue fullness of each of the queues is used to determine from which queues to provide data. Alternatively, the number of segments of data awaiting service for each of the queues is used to determine from which queues to provide data or to determine whether any of the queues has a complete picture of data awaiting transmission.

BRIEF DESCRIPTION OF THE DRAWINGS

The foregoing features and other aspects of the invention will be described in further detail by the accompanying drawings in which.

DETAILED DESCRIPTION

Figure 1:
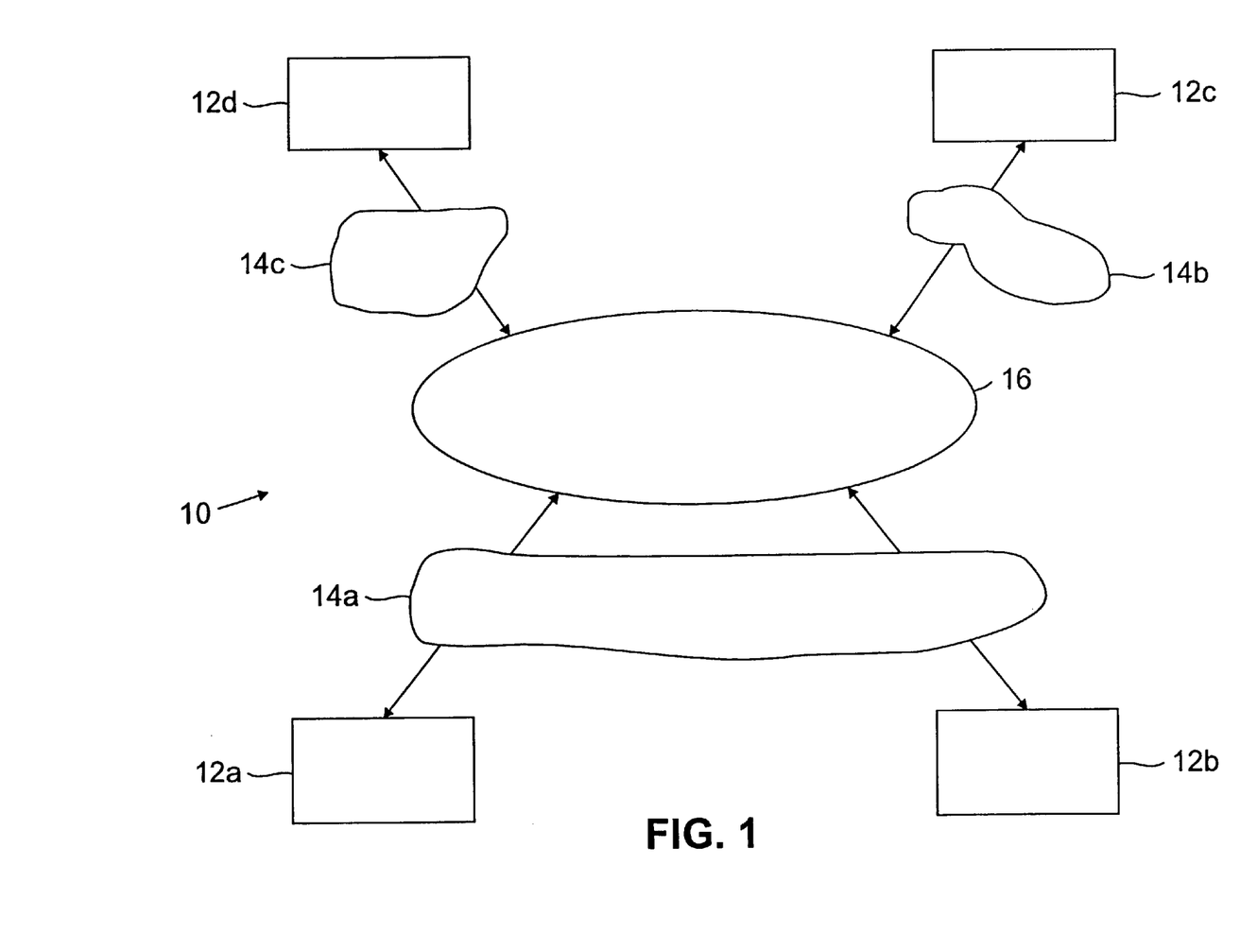
FIG. 1 is a diagrammatical view of a video conferencing system having a plurality of audio-video terminals coupled to a multipoint control unit.

Referring now to FIG. 1, a video multipoint conferencing system 10 is shown to include a plurality of audio-video terminals 12a–12d each interconnected to a multipoint control unit 16 via a variety of communication networks 14a–14c. Illustratively, the communication networks can be any type of communication networks such as private networks, ISDN lines or T1 access lines for switch networks. A videoconference would comprise at least two and preferably three or more of such terminals 12a–12d interconnected via their respective communication networks 14a–14c to the MCU 16. Each one of the audio-video terminals 12a–12d operates at their respective data transfer rates during the video conference.

Figure 2:
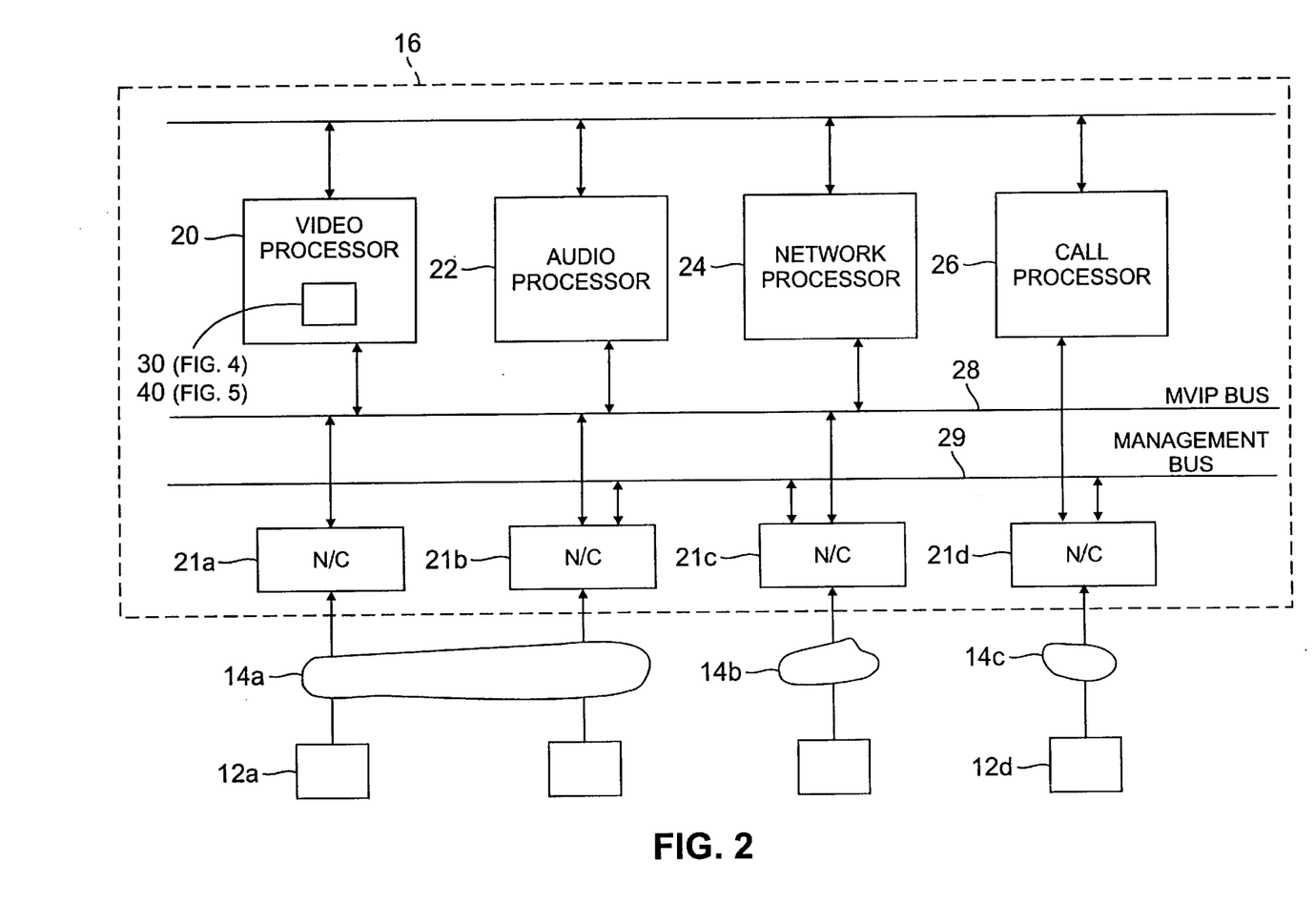
FIG. 2 is a block diagram of a multipoint control unit.

Referring now to FIG. 2, a multipoint control unit 16 is shown to comprise a video processing unit 20. The video processing unit 20 includes a segment processor/combiner 30 (FIG. 4) or a stream processor/combiner 40 (FIG. 5). A particular implementation of a video processing unit 20 including the stream processor/combiner 40 will be described in conjunction with FIG. 7. In addition, the MCU includes an audio processor 22, a network processor 24 and a call processor 26. The audio processor 22 processes audio information in a generally conventional manner. The network processor 24 processes unsynchronized data units from a network bus (MVIP bus 28) and makes data available on the network bus 28 through network interface control units 21a–21d. These network interface control units 21a –21d are coupled to the respective networks 14a–14c to interface the audio-video terminals 12a–12d to the MCU 16.

Figure 3A:
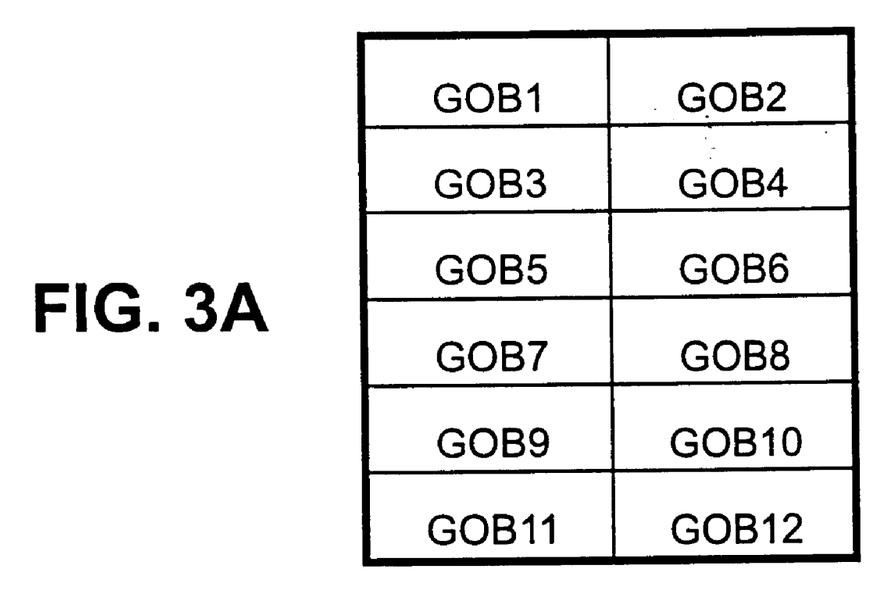
FIGS. 3A–3B are diagrams illustrating formats for the ITU-T H.261 video coding standard.
Figure 3B:
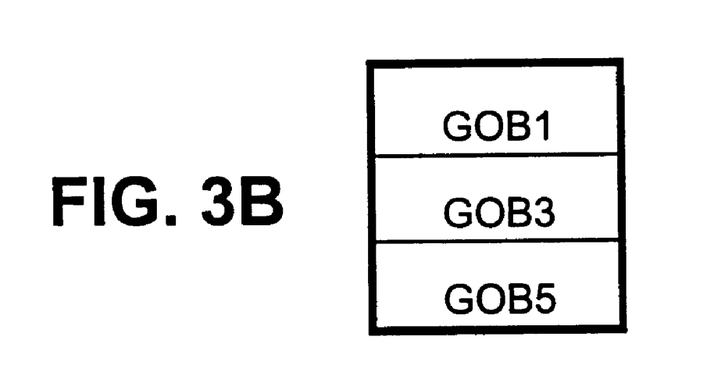
Figure 3C:
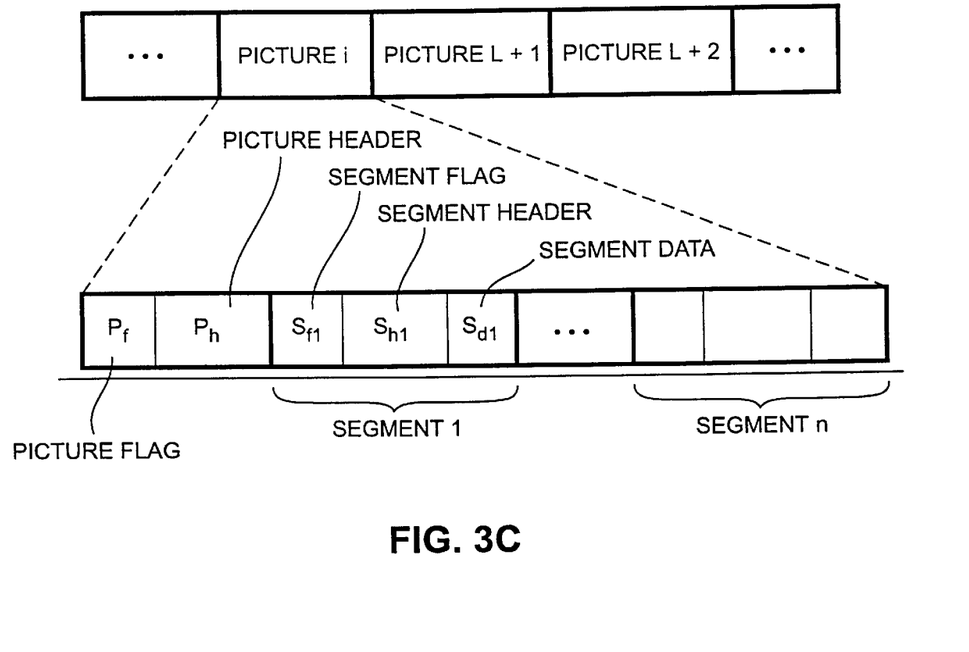
FIG. 3C is a diagram showing a typical video data format.

Referring now to FIGS. 3A–3C, typical video coding format standards for the ITU-T H.261 video coding standard are shown. In digital video coding, a picture is typically partitioned into several non-overlapping segments of data that are separately encoded. As shown in FIG. 3A, in the common intermediate format (CIF) of the H.261 standard, a CIF picture is partitioned into twelve groups of blocks (GOB) numbered from GOB 1–GOB 12. In the H.261 format, a GOB includes a plurality of macro blocks of data. Each GOB has the same spatial size. In the QCIF format (Quarter CIF), a picture is partitioned into three groups of blocks numbered 1, 3 and 5, as shown in FIG. 3B.

Each video sequence contains a sequence of pictures, illustratively pictures i–picture i+2 with each picture in turn containing a unique picture flag $P_f$, a picture header $P_h$ and multiple segments, segment 1–segment n, as illustrated in FIG. 3C. Each segment, segment 1, for example, in turn, contains a unique segment flag $S_{f1}$, a segment header $S_{h1}$ and an optional data segment $S_{di}$. Due to compression, segments with the same spatial sizes may have different numbers of bits after compression. The unique picture and segment flags between two encoded picture segments is used to find a boundary between two segments without performing full decoding.

Figure 3D:
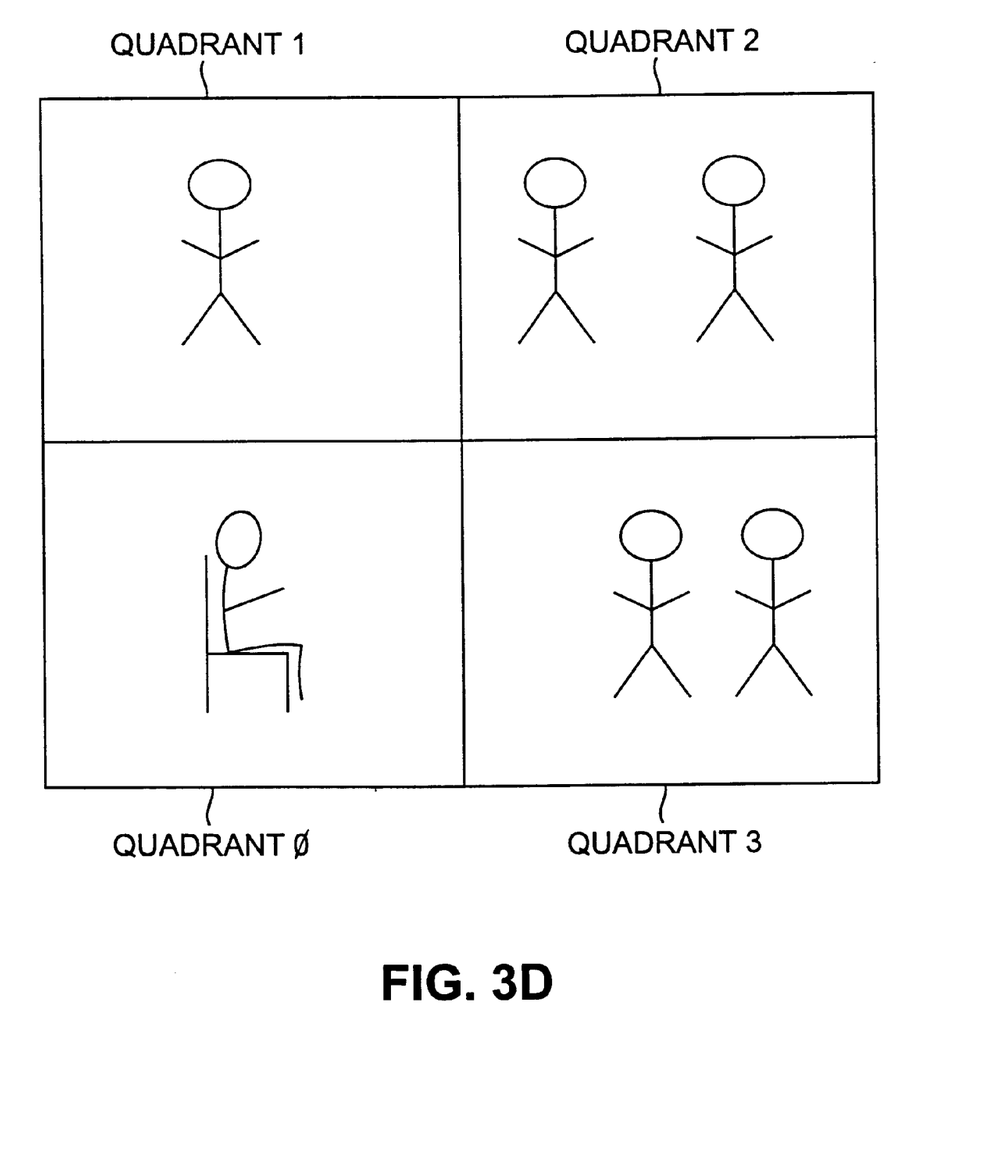
FIG. 3D is a diagrammatical view of a typical display of a video conference.

Referring now to FIG. 3D, a typical displayed representation of a video conference as might appear to a participant is shown. The displayed representation which would typically appear on a monitor (not shown) is here partitioned into four quadrants, quadrant 0 to quadrant 3. Each quadrant displays video from one of the audio/video terminals that is participating in the video conference. If one or more of the quadrants is blank, then there is not a corresponding audio/video terminal participating in the videoconference for that quadrant.

Figure 4:
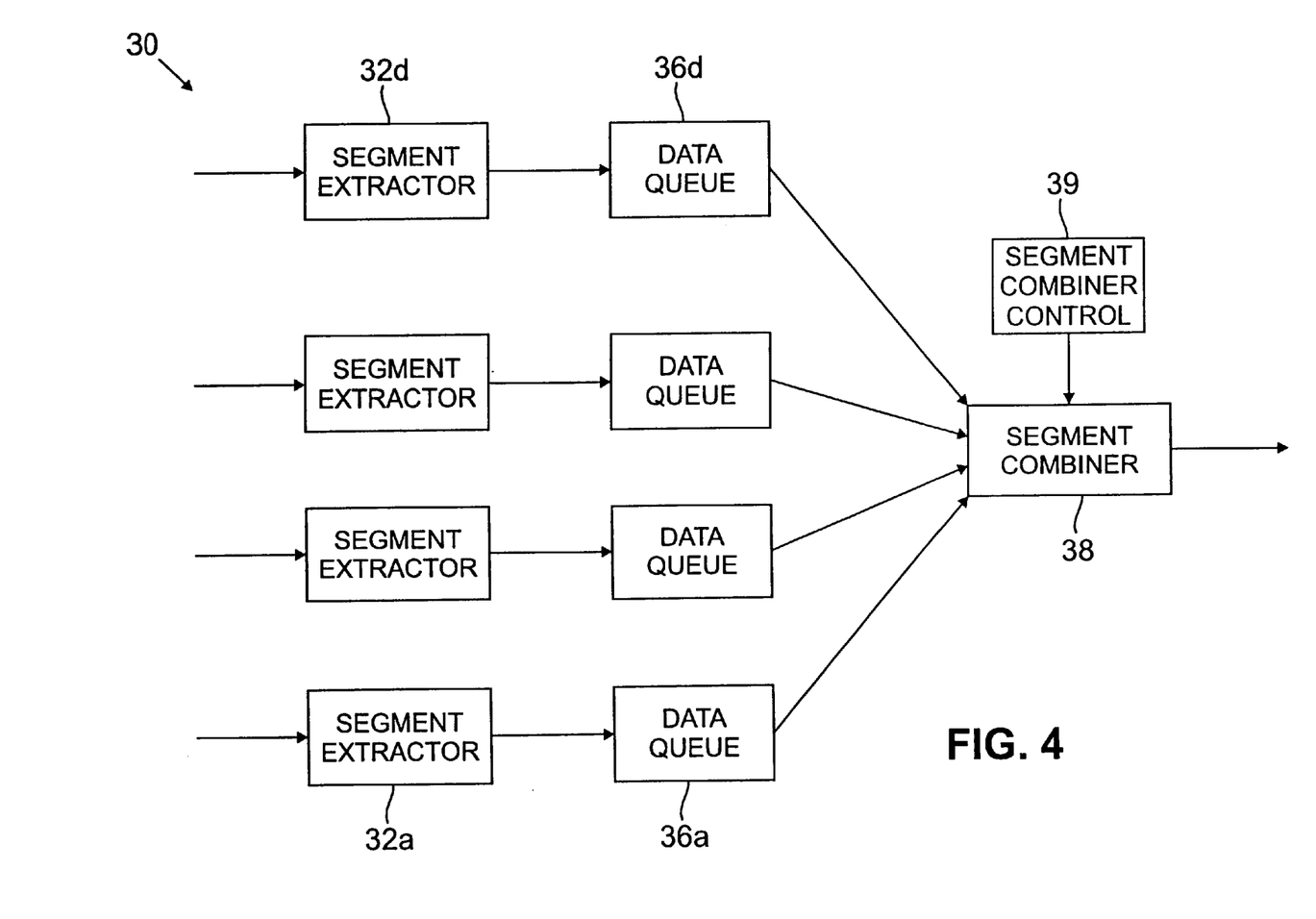
FIG. 4 is a block diagram of a segment combiner architecture.
Figure 5:
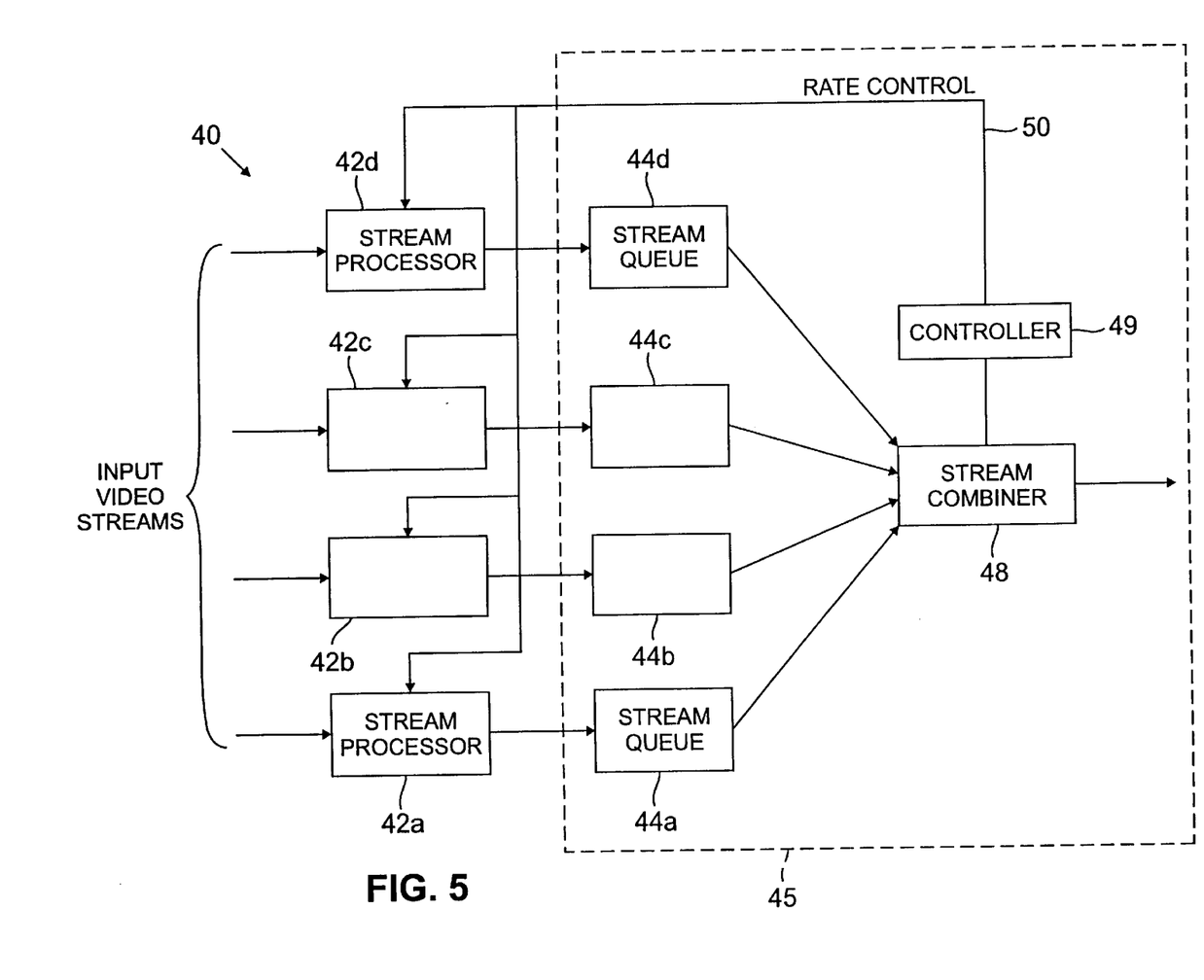
FIG. 5 is a block diagram of a stream combiner architecture.

Referring now to FIG. 4, a digital video mixing system 30 is shown to include a plurality of, here four, segment extractors 32a–32d and respective data queues 36a–36d. The segment extractors 32a–32d are each fed by compressed, received video bit streams from respective audio-video terminals 12a–12d. The bit streams are compressed digital video streams. Each of the segment extractors 32a–32d parses the received bit stream into separate segments which are separated by unique flags. The output of the segment extractor are segments. The segments are placed in respective data queues 36a–36d. The segment combiner 38 selectively assembles segment data from the four data queues to form a composite segment output stream. The segment combiner 38 through operation of the segment combiner control 39 starts to assemble a complete picture or to form a new picture with available segment data contained in segment queues 36a–36d. This approach obviates the need for significant bit stuffing and data buffering which introduces insertion delay. A small amount of bit stuffing may be used if segment data does not arrive promptly at the data queues 36a–36d.

The delay associated with the embodiment of FIG. 4 is minimized in this embodiment by use of asymmetric frame rates and segment level combining. Asymmetric frame rates require the output frame rate to be greater than the input frame rate. The asymmetric frame rates are provided by sending capability codes (containing information as to bit rates, data unit or frame rates, etc.) to each of the N terminals through appropriate control channels. For example, the input frame rate can be 10 frames/sec while the output frame rate can be 15 frames/sec. Because the arrival rates of segments from different inputs can vary significantly due to the variable size of segment data, the encoder/decoder capability and video scene content, the increased output frame rate can significantly reduce the delay associated with the data queues 36a–36d.

The outputs of the queues 44a–44d are fed to combiner 48. The combiner 48 as mentioned above combines data stored in the stream queues 44a–44d here based on the H.261 format. Once the previous picture has been transmitted, the stream controller 49 determines whether a new picture should be formed based on the output and the available data in the queues 44a–44d.

The following two conditions, if satisfied, initiate the start of a new picture. The first condition relates to the time period between pictures. If the number of pictures outputted from the combiner 48 during a predetermined interval of time is greater than a predetermined threshold, a new picture cannot be generated. This is because the threshold which is the maximum picture rate will be exceeded. The second condition is that there is at least one GOB from all of the active quadrants (FIG. 3D) (data queues 46a–46d) if there is at least one active quadrant. If there are no active quadrants, then this latter condition will automatically be satisfied and a new picture will be generated.

After it is determined in controller 49 that a new picture should be generated, the segment combiner control 39 determines whether there is data in the data queues that can be included in a new picture. Several different criteria can be used to determine which data queues to select to provide the picture. One approach determines the queue fullness. In the queue fullness approach the number of bits in each of the queues is determined and compared against a predefined threshold. If the number of bits awaiting transfer in a queue exceeds the threshold, then the combiner selects data from that queue. A second approach uses the number of GOBs of data waiting for service in each queue. If any queue has a complete picture, (e.g., it has three GOBs for the H.261 QCIF format), then that queue with the complete picture is included in the current picture and the remaining quadrants are filled with header bits. If none of the four queues has a complete picture, then those streams with a complete GOB are included in the new picture and the remaining quadrants are filled with header bits.

Therefore, for each picture, a quadrant can be in one of the following three modes: a blank mode, a skip mode and a data mode. The blank mode is used when a quadrant is not yet activated. If all four quadrants are not active, then every quadrant is in the blank mode. If there is at least one quadrant that is active, then a quadrant will be in a blank mode only a number of pictures or frames where the number of pictures is a predetermined number of data units or frames which is smaller than or equal to 132 according to the H.261 specification.

A skip mode is used for a quadrant if the quadrant is active but either does not have data to transmit or its priority so that data from its quadrant is not transmitted in the current picture. A skip mode is used also for an inactive quadrant that is not in a blank mode.

The third mode, the data mode, is used when data in the receive queue will be transmitted.

Although a data queue is shown associated with each segment extractor 32a–32d, it would be possibe to share data queues, even using a single data queue to store data from all of the extractors 32a–32d. Data would be extracted from the shared queues or single queue based generally on the above approach.

The approach shown in FIG. 4 provides an output channel that has a higher data rate capacity than the input channels because information content of the input channels are merged together without compression. Certain types of networks can accommodate this requirement. For example, this requirement can be facilitated under certain networks such as local area networks where asymmetric bit rate channels can be accommodated. However, in situations such as public service telephone networks (PSTN) or integrated service digital networks (ISDN) asymmetric bit rates are not supported.

Referring now to FIG. 5, an alternative digital video mixer architecture 40 includes a plurality of here four stream processors 42a–42d that are fed by respective input video streams from the respective audio-video terminals 12a–12d (FIG. 1) and which provide output streams to stream queues 44a–44d, respectively. The stream queues 44a–44d provide outputs to a stream combiner 48. The stream combiner 48 under control of a controller 49 sums four potential video streams from the stream processors 42a–42b into a single output stream. The stream controller 49 also produces a rate control via a line 50. The rate control information on line 50 is fed to each of the stream processors 42a–42d.

This architecture is particularly useful in ISDN or PSTN applications where asymmetric bit rates are not supported. The multiple video streams are received from the audio-video terminals (FIG. 1) and are processed by stream processors 42a–42d. The input stream to the stream processors have call set-up and framing alignment provided and audio video demultiplexing performed so that the input to the stream processor is solely video data. The stream processors 42a–42d reduce the output bit rates from each of the video input streams and provide segment data extraction.

A rate reduction technique that can be implemented in the stream processors 40a–40d disclosed in U.S. application Ser. No. 08/786,070 now U.S. Pat. No. 5,870,146 entitled DEVICE AND METHOD FOR DIGITAL VIDEO TRANSCODING, filed Jan. 21, 1997 by Q. F. Zhu, said application being assigned to the assignee of the present invention and incorporated herein by reference.

The preferred approach for selecting data queues to furnish data to the stream combiner 48 is to use as a criteria the number of GOBs of data waiting for service in each queue. If any one of queues 46a–46d has a complete picture, that is, three GOBs for H.261 queue streams, for example, then data from those queues are included in the current data unit or frame. The remaining quadrants corresponding to queues with less than a complete picture are filled with header bits. If none of the four queues has a complete picture, then streams from those queues with a complete GOB are included in the current picture and the remaining quadrants are filled with header bits.

The resulting output bit rates from each of the stream processors 42a–42d may be equal. This approach would be a simple approach since the rate control can be performed independently by each stream processor. However, under certain circumstances, the output video quality may be inferior because if some of the streams have less changes in video data and hence need fewer bits to code in the output stream from the combiner, their allocated bits in the output are wasted.

Accordingly, a preferred approach is to adjust the output bit rates from the stream processors such that their total output bit rate does not exceed the maximum output bit rate from the stream combiner 48, but not to impose a requirement that the output bit rates be all equal. The rate from the stream combiner is thus in accordance with a rate expected from a remote terminal. In this manner, the overall bits are allocated to each of the streams based upon the demand of the input streams in accordance with the change in the video data. The output of the stream processor is compressed video data arranged into units of segments. Since the stream combiner 48 operates at segment boundaries, it does not have to detect a segment boundary again. Although the exact format of the data output from the stream buffer is not important, it is noted that the data can be arranged into packets with a header field holding the length of the segment. Alternatively, the output data can use a special flag or some other device to signal segment boundaries.

The stream combiner 48 provides a stream processor with a global delta quantization parameter $\Delta Gqp$ for rate control. The rate control parameter that is generated is based upon the fullness of the data queues.

The rate control algorithm implemented in the rate controller 49 generates a positive offset based upon the sum and maximum of queue fullnesses of the four received queues as follows:

$$\Delta Gqp = \max[(B_{max}-96)*0.032, (\Sigma B_i - 192)*0.016]$$

where $B_i$ is the queue fullness for stream I in words and $B_{max}$ is the maximum queue size among the four receive queues 44a–44d expressed in words. The quantity ΔGqp is sent to the stream processor nodes.

A local delta quantization parameter, Δqp, is derived from the global delta quantization parameter ΔGqp in accordance with the following equation:

$$\Delta qp = (31-QP_{old})*\Delta Gqp/16$$

where QPold is the quantization parameter used for the input bit stream generated by the terminal encoder. The quantization parameter $QP_{new}$ is the sum of $QP_{old}$ and Δqp:

$$QP_{new} = \min(QP_{old} + \Delta QP*(31-QP_{old})/16, 31)$$

The above equation requires those more finely quantized streams to use a larger quantization parameter (Δqp). This produces the effect that for those streams with more motion, more bits will be allocated in the output of the combiner 48.

Although a data queue is shown associated with each stream processor 42a–42d it would be possibe to share data queues, even using a single data queue to store data from all of the stream processors 42a–42d. Data would be extracted from the shared or single queues generally using the above approach.

Figure 6:
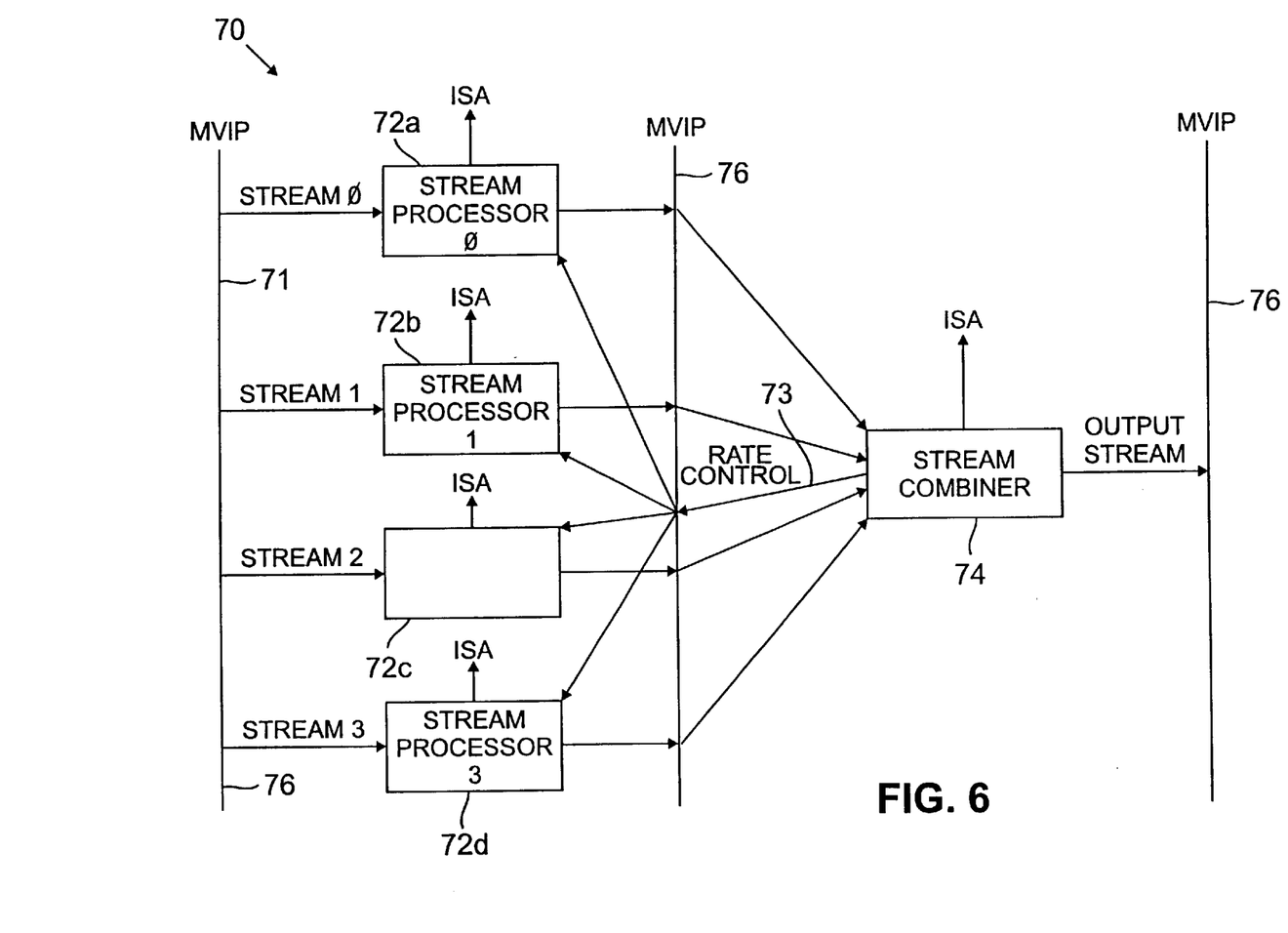
FIG. 6 is a block diagram of a video processor architecture that implements a digital video mixing function.

Referring now to FIG. 6, a video processor system 70 has four stream processors 72a–72d and a stream combiner 74. The system 70 is one example which implements a digital video mixing function used for continuous presence conferencing under the ITU-T H.320 protocol stack. The received data are compressed by the stream processors 72a–72d and picture segment data are outputted to an MVIP 76 bus and are in turn delivered to the stream combiner 74. The MVIP bus 76 is illustrated as three busses. As used here, the MVIP bus is a time division multiplexed bus which can handle all of the illustrated transfers. The output of the stream combiner 74 is delivered to the MVIP bus for transmission to the remote terminals 12a–12d (FIG. 2). Rate control is provided via line 73.

Figure 7:
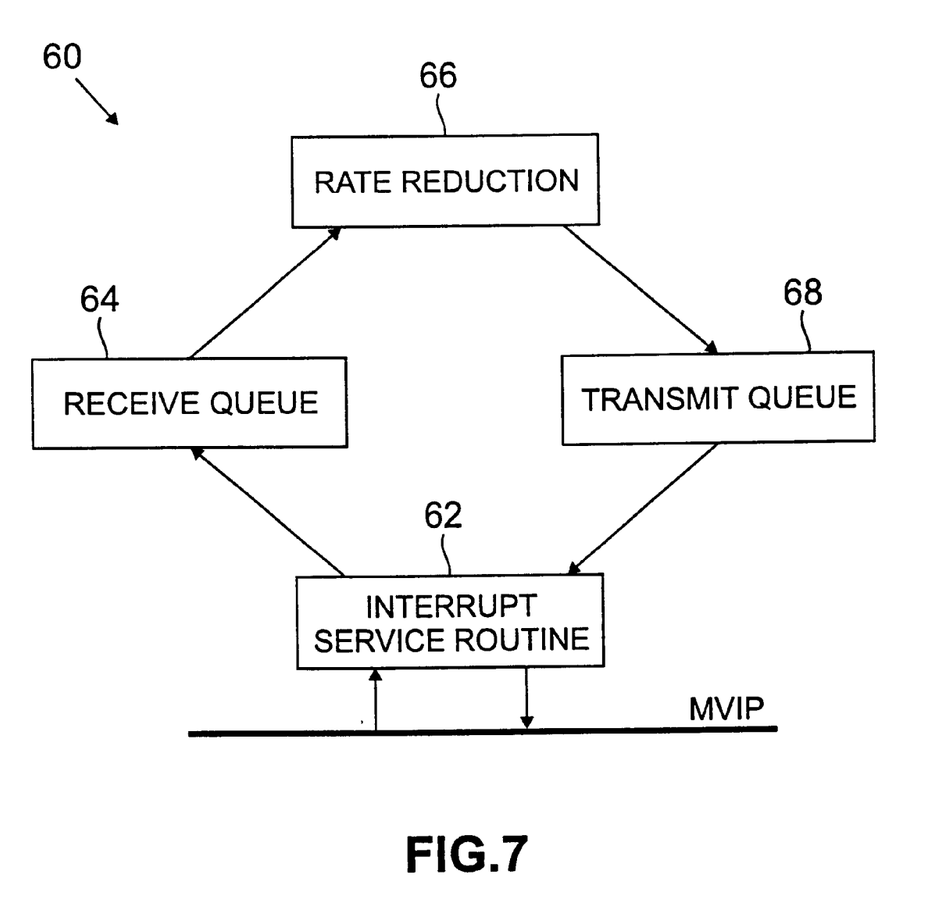
FIG. 7 is a software layer involved in a stream processor.

Referring now to FIG. 7, software layers of the stream processor 40 are shown. The stream processor 40 has an interrupt service routine layer 62 which interfaces with the MVIP bus. The stream processor 40 also has a store mode 64 in which the receive queue stores data fed from the transmission network to the stream process node via the interrupt service routine layer 62. From the receive queue, rate reduction 66 operates on the data and the data is formatted into segments that are sent out to the transmission queue layer 68 for transmission back to the MVIP bus via the interrupt service routine 62. These are in turn delivered to the stream processor 40.

Figure 8:
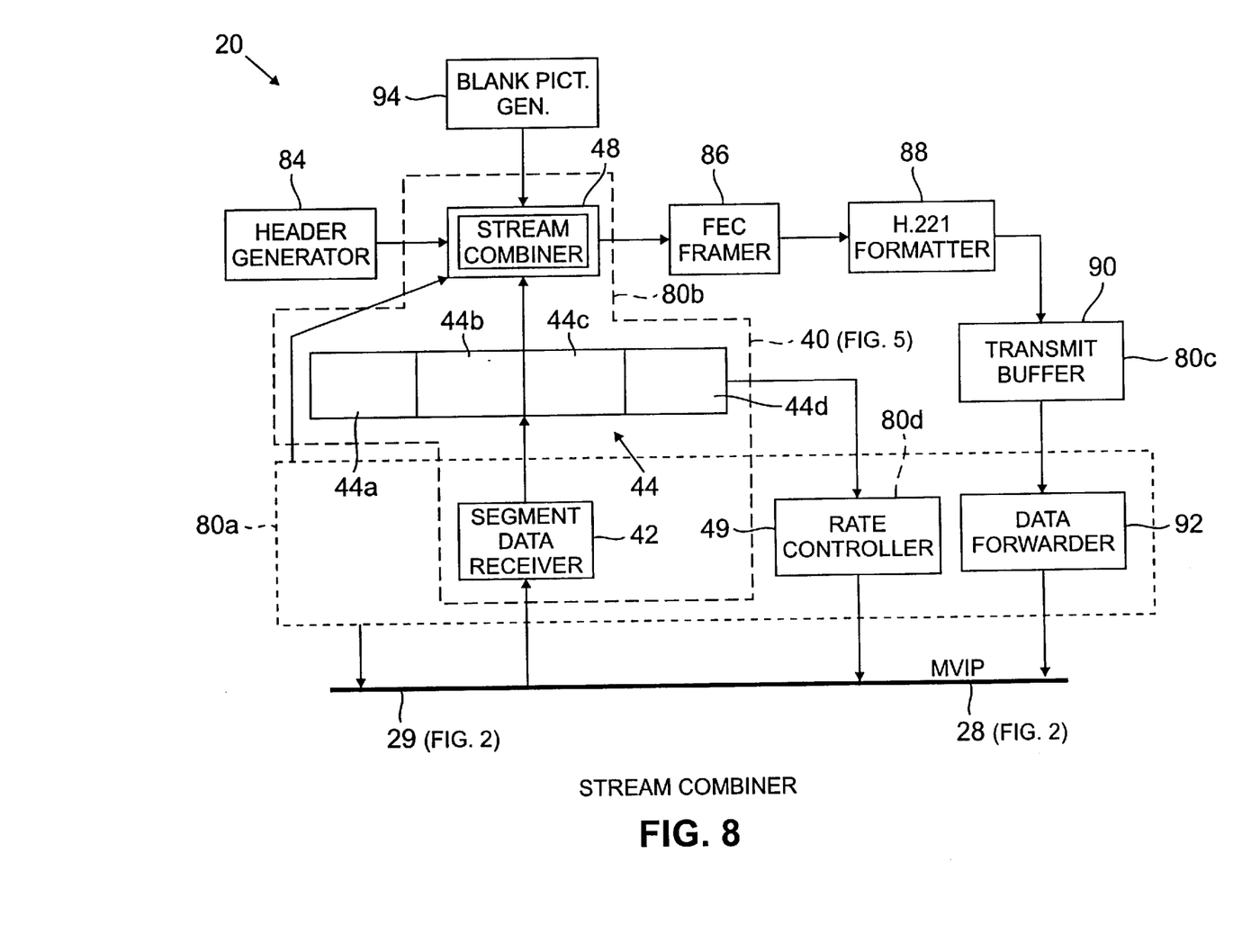
FIG. 8 is a block diagram of an implementation of a stream combiner.

Referring now to FIG. 8, an implementation 20' of the stream combiner 40 (FIG. 5) is shown. The stream combiner 20' includes a segment data receiver 83 that sends data to stream queues 44a–44d. The stream queues also provide a signal to controller 49 which monitors the fullness of each one of the streams and sends rate control information to the stream processor 42a–42d (FIG. 5) nodes via MVIP bus 28.

The stream combiner 20' also includes a header generator 84. The header generator 84 is used to generate the picture and GOB header bits for transmission to forward error correction (FEC) framer 86. The stream combiner 20' includes a blank picture generator 94. The blank picture generator 94 is used for generating blank picture information with a gray color when a quadrant is in the blank mode. In this mode, a whole macro block of data is precomputed and stored in three words. The blank mode macro block has six blocks which only have a DC coefficient. The FEC framer is used to generate framing information and FEC bits based on the H.261 protocol. This data is fed to a formatter 88. Here the formatter is an H.221 formatter, although others can be used. The H.221 formatter formats the data for acceptance by those audio-video terminals that accept the H.221 format. The audio, data, and service channel portion of H.221 data are filled with undefined bits. From the formatter 88 the data is stored in a transmit buffer 90. The data stored in the transmit buffer 90 is buffered for transmission to a data forwarder 92 coupled to the MVIP bus 28. The data are picked up by an H.221 multiplexer that fills in the audio, data and service channel portions of the H.221 data and is transferred to the network interface controls 21a–21d and to the respective terminals 12a–12d (FIG. 2).

Having described preferred embodiments of the invention, other embodiments incorporating their concepts may be used. For example specific embodiments have been described based on the H.261 coding format. Other formats could alternatively be used. Therefore, invention should not be limited to the disclosed embodiments, but rather should be limited only by the scope of the appended claims.

What is claimed is:

1. A method of operating a multipoint control unit for use in videoconferencing of a plurality of audio-video terminals comprises:

feeding a plurality of video streams to the multipoint control unit;

for said video streams, extracting segments of data;

outputting the segments of data to a data queue;

forming new pictures from the segments of data stored in each of the data queues by:

including the new picture data from those queues that have a complete picture;

and if no queue has a complete picture, determining if for each of the queues whether the queues have a complete segment of data and for those queues having a complete segment of data including data from those queues in the new picture.

2. The method of claim 1 wherein forming new picture includes determining for each of the data queues which queues have a complete picture.

3. The method of claim 2 wherein for those quadrants not having a complete picture or a complete segment of data including in the current picture header bits for those quadrants.

4. The method as recited in claim 3 wherein the data from the queues corresponding to quadrants in the current picture and header bits for quadrants not in the current picture are combined into a single video stream that is fed to each of the audio-video terminals in the video conference.

5. A method of operating a multipoint control unit for use in videoconferencing of a plurality of audio-video terminals comprises:

feeding a plurality of video streams to the multipoint control unit;

for each one of said streams, extracting segments of data and adaptively reducing the bit rates;

outputting the segments of data to a data queue;

forming new picture data units from the segments of data stored in each of the data queues by:
including the new picture data from those queues that have a complete picture;
and if no queue has a complete picture,
determining if for each of the queues whether the queues have a complete segment of data and for those queues having a segment of data including data from those queues in the new picture.

6. The method of claim 5 wherein for those quadrants not having a complete picture or a complete segment, including in the current picture header bits for such quadrants.

7. The method as recited in claim 6 wherein the data from the queues corresponding to quadrants in the current picture and header bits for quadrants not in the current picture are combined into a single video stream that is fed to each of the audio-video terminals in the video conference.

8. The method of claim 7 wherein the determining further includes:
assigning a threshold in accordance with a number of complete segments of data in the queue.

9. The method of claim 8 wherein the determining further includes:
assigning a threshold in accordance with the number of complete segments of data in the queue.

10. The computer program product of claim 9 wherein instructions that cause the multipoint control unit to determine further comprises instructions to:
determine the number of segments of data awaiting service for each of the queues.

11. The computer program product of claim 10 wherein instructions that causes the multipoint control unit to determine if there is data in the queues further comprises instructions to:
determine for each of the queues whether there is a complete segment of data for the current picture in the queue.

12. The computer program product of claim 11 wherein instructions that cause the multipoint control unit to reduce bitrate use requantization with a requantization stepsize being a sum of a quantization stepsize in the received bitstream and a differential quantization stepsize.

13. The computer program product of claim 11 wherein instructions that causes the multipoint control unit to reduce bitrate use said differential quantization stepsize derived from a bitrate control data and said quantization stepsize in the received bitstream.

14. The computer program product of claim 13 wherein said differential quantization stepsize is derived from a bitrate control data and said quantization stepsize in the received bitstream.

15. The computer program product of claim 14 wherein said differential quantization stepsize is a function that is monotonically increasing with said bitrate control data and monotonically decreasing with said quantization stepsize in the received bitsteam.

16. A multipoint control unit comprises:
a plurality of segment processors arranged to extract segment data from a corresponding plurality of input video streams;
a plurality of data queues, each one of said data queues being coupled to a corresponding one of said plurality of segment processors for storing segment data provided from said segment processors;
a segment combiner coupled to said data queues for combining output data from said data queues; and
a controller coupled to said segment combiner for selectively providing rate control data to said segment processors in accordance with the amount of the data in said data queues.

17. The multipoint control unit of claim 16 wherein said combiner generates a compressed video bitstream with an output picture rate that is no less than a maximum input picture rate of said input video streams.

18. The multipoint control unit of claim 16 wherein said combiner determines the queue fullness of each of the queues.

19. The multipoint control unit of claim 16 wherein said combiner determines the number of segments of data awaiting service for each of the queues.

20. The multipoint control unit of claim 19 wherein said combiner that determines if there is data in the queues further determines if any of the queues has a complete picture of data awaiting transmission.

21. The multipoint control unit of claim 20 wherein said combiner determines for each of the queues whether there is a complete segment of data for the current picture in the queue.

22. The multipoint control unit of claim 16 wherein the segment processors further comprise:
a bit rate reducer; and
the combiner controller sends bit rate control information to the reducer to control the operation of the reducer.

23. The multipoint control unit of claim 22 wherein said controller determines the queue fullness of each of the queues.

24. The multipoint control unit of claim 23 wherein the segment processors use a requantization stepsize being a sum of a quantization stepsize in the received bitstream and a differential quantization stepsize.

25. The multipoint control unit of claim 24 wherein said differential quantization stepsize is derived from a bitrate control data and said quantization stepsize in the received bitstream.

26. The multipoint control unit of claim 24 wherein said differential quantization stepsize is a function that is monotonically increasing with said bitrate control data and monotonically decreasing with said quantization stepsize in the received bitsteam.

27. The multipoint control unit of claim 26 wherein said differential quantization stepsize $\Delta qp$ is related to $$\Delta qp = (31 - Qp_{old}) * \Delta Gqp / 16$$

where $\Delta Gqp$ is the bitrate control data from the combiner controller and $QP_{old}$ is the quantization parameter used for the input bit stream generated by the terminal encoder.

28. A method of operating a multipoint control unit for use in a multipoint video conference comprises:
extracting segment data from a plurality of video streams;
storing the segment data in a one of a plurality of data queues;
determining whether there is data in any of the plurality of data queues that can be included in a new picture; and
combining data from said plurality of data queues in accordance with a determination of whether there is data in the data queues;
wherein the determining further comprises:
determining a number of segments of data awaiting service for each of the queues.

29. The method of claim 28 wherein determining if there is data in the queues further comprises:

determining if any of the queues has a complete picture of data awaiting transmission.

30. The method of claim 29 wherein said determining if there is data in the queues further comprises:

determining for each of the queues whether there is a complete segment of data for the current picture in the queue.

31. A method of operating a multipoint control unit for use in a multipoint video conference comprises:

extracting segment data from a plurality of video streams;

storing the segment data in a one of a plurality of data queues;

determining whether there is data in any of the plurality of data queues that can be included in a new picture; and combining data from said plurality of data queues in accordance with a determination of whether there is data in the data queues; wherein said extracting further comprises:

selectively reducing output bit rates from each one of said data queues;

wherein said combining further comprises:

combining data from said data queues to provide an overall output video bit stream syntax from the multipoint control unit which is in accordance with a syntax expected from a remote terminal.

32. The method of claim 31 wherein said reducing output bit rate is performed by requantizating with a requantization stepsize being a sum of a quantization stepsize in the received bit stream and a differential quantization stepsize.

33. The method of claim 32 wherein said differential quantization stepsize is derived from a bit rate control data and said quantization stepsize in the received bit stream.

34. The method of claim 33 wherein said differential quantization stepsize is a function that is monotonically increasing with said bit rate control data and monotonically decreasing with said quantization stepsize in the received bit stream.

35. The method of claim 34 wherein said bit rate control is derived from a queue fullness of said data queues.

36. A computer program product residing on a computer readable medium comprising instructions for causing a multipoint control unit to:

extract segment data to provide a plurality of extracted segment streams;

store each one of the segment data streams in a one of a plurality of data queues;

determine which of said data queues has data for inclusion in a new picture; and combine data from said plurality of data queues in accordance with a determination of which data queues has data for inclusion in the new picture;

wherein an output picture rate of the combined video bit stream is related to the maximum input picture rate of said input video streams;

wherein instructions that causes the multipoint control unit to determine if there is data in the queues further comprises instructions to:

determine if any of the queues has a complete picture of data awaiting transmission.

37. A computer program product residing on a computer readable medium comprising instructions for causing a multipoint control unit to:

extract segment data to provide a plurality of extracted segment streams;

store each one of the segment data streams in a one of a plurality of data queues;

determine which of said data queues has data for inclusion in a new picture; and combine data from said plurality of data queues in accordance with a determination of which data queues has data for inclusion in the new picture;

wherein an output picture rate of the combined video bit stream is related to the maximum input picture rate of said input video streams;

wherein instructions that causes the multipoint control unit to extract further comprises instructions to:

reduce output bit rates from the extracted segment data streams; and combine data from said data queues to provide an overall output video bit stream from the multipoint control unit which is in accordance with a syntax expected by a remote terminal.

38. A computer program product residing on a computer readable medium comprising instructions for causing a multipoint control unit to:

extract segment data to provide a plurality of extracted segment streams;

store each one of the segment data streams in a one of a plurality of data queues;

determine which of said data queues has data for inclusion in a new picture; and combine data from said plurality of data queues in accordance with a determination of which data queues has data for inclusion in the new picture;

wherein an output picture rate of the combined video bit stream is related to the maximum input picture rate of said input video streams;

wherein said bit rate control is derived from the queue fullness of said data queues.

* * * * *